United States Patent [19]

Boyer

[11] 4,149,751
[45] Apr. 17, 1979

[54] DUMP TRUCK

[75] Inventor: Jean-Jacques Boyer, Montchauvet, France

[73] Assignee: Societe Anonyme Secmafer, Buchelay, Mantes la Jolie, France

[21] Appl. No.: 866,786

[22] Filed: Jan. 3, 1978

[30] Foreign Application Priority Data

Feb. 23, 1977 [FR] France ............................. 77 05263
Oct. 10, 1977 [FR] France ............................. 77 30417

[51] Int. Cl.² ............................................. B60P 1/16
[52] U.S. Cl. .................................. 298/22 P; 298/17 R
[58] Field of Search ................. 298/17 R, 19 R, 22 R, 298/22 J, 22 P, 22 D

[56] References Cited

U.S. PATENT DOCUMENTS 4,071,277  1/1978  Stedman .......................... 298/22 P

FOREIGN PATENT DOCUMENTS 823023  11/1959  United Kingdom ................. 298/17 R

*Primary Examiner*—Francis S. Husar
*Assistant Examiner*—George F. Abraham
*Attorney, Agent, or Firm*—Young & Thompson

[57] ABSTRACT

This invention relates to tip lorries.

The dumper is of the type comprising a chassis frame provided with at least four carrying wheels 2, two of which at least being driving wheels, with a tipper articulated on the chassis frame about an axis 30 situated in the vicinity of one end of the chassis frame above and at the rear of the wheel axis corresponding to said end, the bottom of the tipper enveloping while it tipps a cylindrical sector surface with a radius superior to the radius of the wheels 2b situated at said end, wherein a driver's cab 28 is lodged between said wheels 2b inside the volume limited by said cylindrical sector surface.

This invention is used in units with a carrying capacity approaching 200 tons.

10 Claims, 7 Drawing Figures

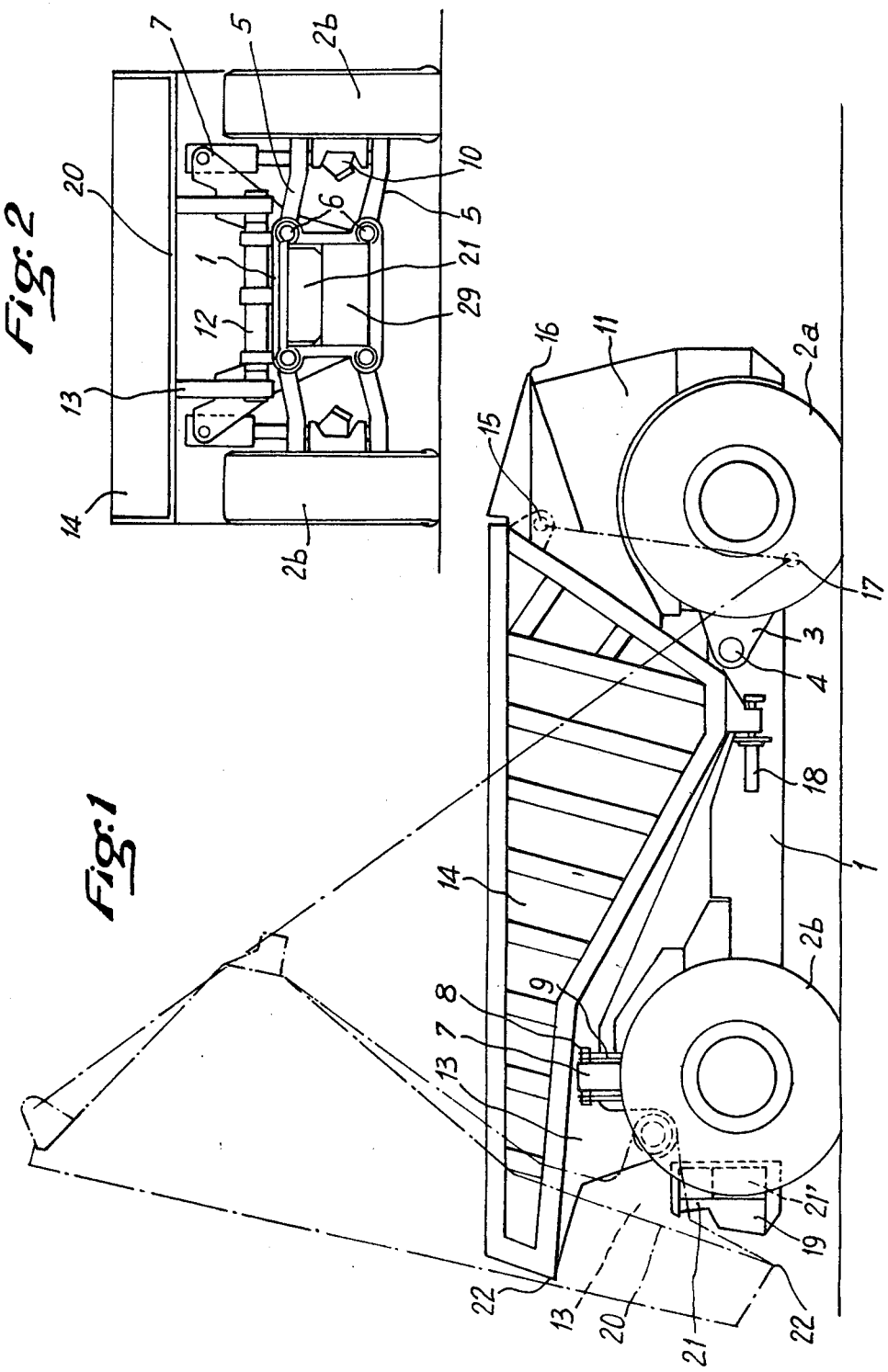

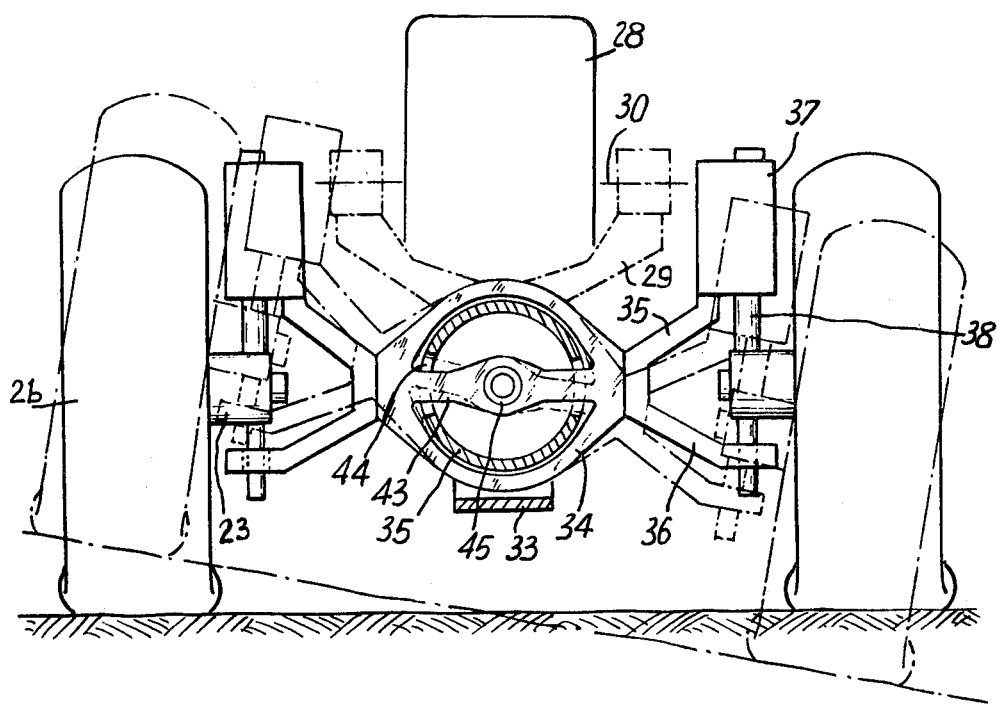
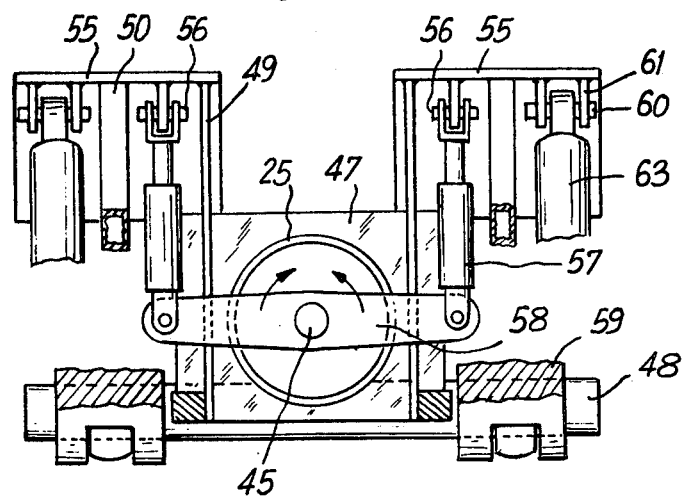

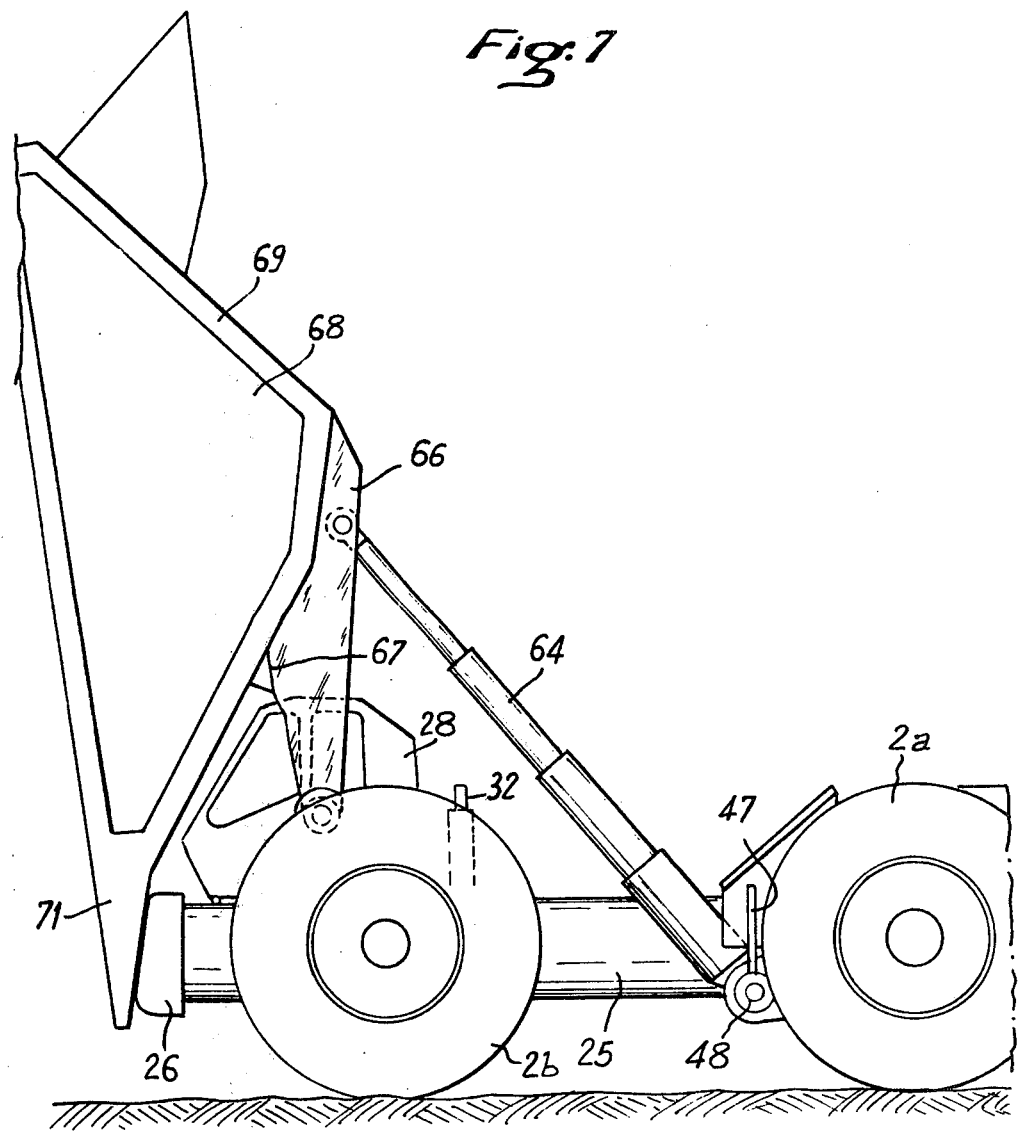

DUMP TRUCK

The present invention relates to tip lorries, generally called dumpers, and in particular to units of such type of large dimensions whereby a full weight of 300 tons may be reached with a carrying capacity approaching 200 tons.

Known units of such type having lower carrying capacity are units tipping at the rear, meaning that in the forward portion of the chassis frame are placed the driver's cab and the motor unit with, behind the cab, the tipper which often has a longitudinal cross-section of trapezoidal or triangular configuration with the maximum height in a position between both axles so that the load is distributed between said axles. The tipper is articulated on the chassis frame about a transverse axis positioned above and at the rear of the rear axle, and it is tipped by at least one hydraulic jack operating between the chassis frame and its forward end.

Once loaded, such units are unloaded either into the hopper of a rock-crusher, or into artificial or natural pits limited by a more or less steep wall. The driver of a unit with rear wardly tipping tipper must therefore reverse his car in a very precise position, which may be of the order of a few centimeters, in order that the edge of the bottom of the tipper is situated, from the beginning to the end of the tipping movement, above the opening of the rock-crusher or beyond the edge of the pit. Such an operation becomes almost impossible when heavy lorries are used the tipper of which projects largely out on either side of the cab, whereby there is no possibility to see from the cab the position of the rear wheels.

Such problems arise in particular with the 140 tons carrying capacity tipping lorry which was previously manufactured by the applicant and which illustrates the known art. Such a unit is provided with four driving wheels of large diameter driven by hydraulic motors supplied from pumps driven by combustion engines. With such dimensions, the diameter of the carrying wheels exceeds three meters with a space between the wheels exceeding four meters. The lower portion of the tipper should tip while remaining outside a cylinder enveloping the periphery of the rear wheels in order that there remains between the wheels a significant clearance volume.

The invention uses the existing clearance volume between the wheels above which tips the tipper for installing a driver's cab therein.

The object of the invention is therefore a tipping lorry of the type comprising a chassis frame provided with at least four carrying wheels, two of which at least being driving wheels, with a tipper articulated on the chassis frame about an axis situated in the vicinity of one end of the chassis frame above and at the rear of the wheel axis corresponding to said end, the bottom of the tipper enveloping, while it tips, a cylindrical sector surface with a radius superior to the radius of the wheels situated at said end, in which the driver's cab is positioned between said wheels inside the volume limited by said cylindrical sector surface.

The driver's cab situated in the vicinity of the tipping axis may be an auxiliary cab, but preferably is the single main cab. The wheels situated on either side of the cab according to the invention may have fixed axles, but they are preferably steering wheels.

This new concept of the whole assembly of a tipping lorry has proved to offer particular advantages and to authorize new constructive characteristics providing important and unforeseeable advantages as regards safety of behaviour of the car while moving about and manoeuvering, and the possibility of lightening the chassis frame.

Due to the position of the driver's cab which not only provides a very good visibility on the tipper discharge side, but also towards the rear when the tipper is tipped, it is indeed possible and preferable to do away with the usual driver's cab which was positioned above the so-called front wheels with, below or on the side of said cab, the motor unit and eventually the hydraulic transmission pump. The centre of gravity of the tipper being also, in the dumpers of the prior art, situated between the front and rear wheels due to the reduction in height of the tipper above the rear wheels above which they tipped, the chassis frame of the dumper upon which rested the weight of the loaded tipper had to be extremely rigid and the load distribution resulted in an important load on the front wheels with a centre of gravity in a high and very forward position. The result was very bad braking possibilities and the risk for the dumper to topple over its front wheels in downward slopes mainly when braking.

With the basic concept of the invention, the load distributions are being reversed due to the fact that the motor unit and the hydraulic driving pump are located above the rear wheels and that the tipper portion of reduced height necessary for authorizing tipping is situated over the front wheels.

Due to this fact, the tipper itself may be used as an element for transferring the load on the front and rear axles, thereby unburdening the chassis frame. Moreover, the forward edge of the tipper in its tipped position comes to rest on the front bumper of the dumper, and it is therefore possible to use the tipper in said position for pushing or spreading the discharged heap without endangering the jacks tipping the tipper.

Consequently, and in accordance with a further characteristic of the invention, the chassis frame is formed of a forward portion comprising a cross member carrying the steering wheels and support elements for the cab and the tipping articulation axis brackets of the tipper, as well as a rear portion comprising the suspension devices for the rear wheels, the motor unit and support elements for the tipper, both front and rear portions being connected by a longitudinal element acting as a pivot for at least the front cross member carrying the forward wheels. According to a further characteristic, a transfer element for the torque is provided between the cross member carrying the front wheels and the rear portion of the chassis frame. This torque transferring element is preferably made of a longitudinal rod fixed on one of the forward and rear elements and carrying at its other end a crank on which acts at least one resilient element, the other end of which is rigid with the other element.

The longitudinal element is preferably a tubular element. According to a preferential embodiment, the cross member which carries the front wheels is secured to an rocking lever diametrically crossing the tubular element through two openings in diametral facing relationship, on which said rocking lever is keyed the longidutinal rod at the rear end of which is keyed a second rocking bar with, acting on each rocking bar end, a hydropneumatic jack the pressure of which is adjustable as a function of the load.

As a result of this construction, both front and rear axles can adapt to the transverse profile of the ground without any stress being created on the chassis frame the load transfer between the front and rear axles being carried out exclusively by the longitudinal bar.

According to a further feature, the box of each front wheel is rotatably mounted about an axle perpendicular to its own axis and co-axial with the axis of the suspension hydropneumatic jack, said jack and said perpendicular axle being guided and supported by the front wheels cross bar. The steering is provided by a rod linking system comprising two links which are rigidly locked with a box so as to drive said box in rotation, the ends of said two links being connected by a tie-rod and the rotation being urged by at least one jack acting between one point of the cross member and a point of the rod linking system.

According to a further characteristic, the rear unit is rigid with the end of the longitudinal element acting as a pivot and comprises a frame carrying the support plates for the tipper and a transverse axis upon which are articulated two rocking arms carrying the rear wheel boxes, the suspension being provided by hydropneumatic jacks acting between each support plate and a point of each rear wheel rocking arm. According to a preferential embodiment, the hoisting jacks of the tipper are articulated at their end opposite the tipper to a transverse shaft carrying the rear rocking arms.

The invention will become more apparent from the following description of the two embodiments thereof when taken in conjunction with the accompanying drawings, wherein:

FIG. 1 is a schematic side elevation view of the dumper according to the invention, as per a first embodiment;

FIG. 2 is a front elevation view of the dumper of FIG. 1;

FIG. 5 is a schematic cross-sectional view along line V—V of FIG. 3;

FIG. 6 is a detailed view along line VI—VI of FIG. 3, and,

FIG. 7 is a side elevation view of the dumper in tipping position.

Figure 3:
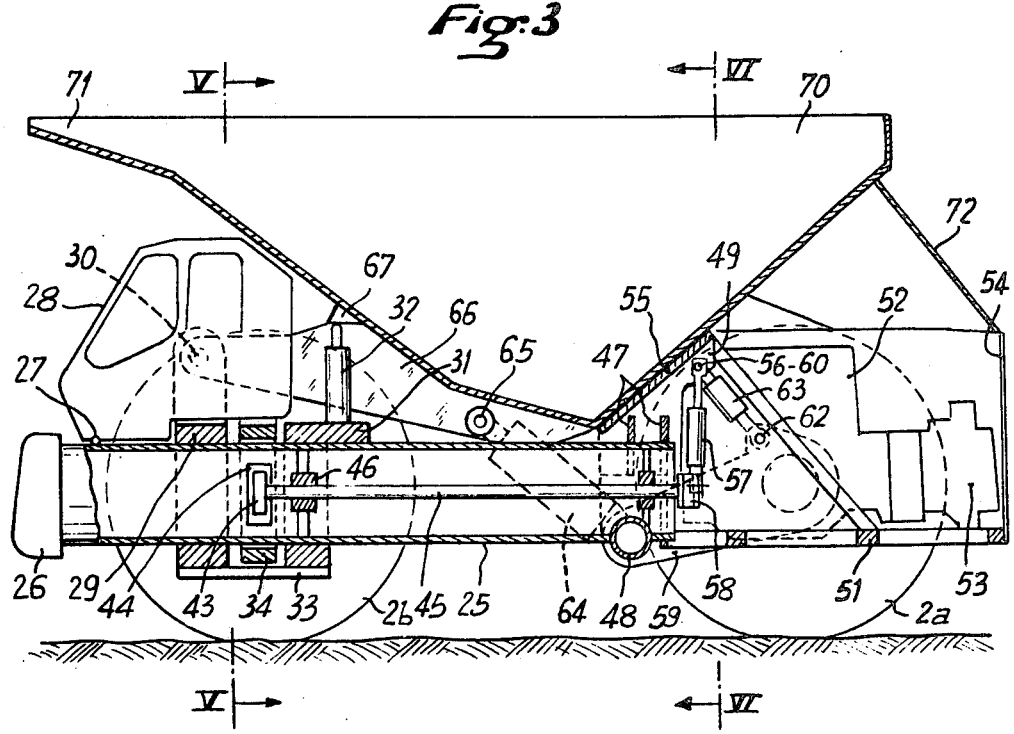
FIG. 3 is a partial schematic longitudinal cross-sectional view of a dumper according to the invention, as per a second embodiment.

The dumper which is shown in FIGS. 1 and 2 comprises a chassis frame 1 carried by four wheels 2 of large diameter with large section tires. In the illustrated embodiment, the wheels 2a are carrying wheels and are each carried by a rocking arm 3 articulated on an axis 4 with suspension means not shown. The wheels 2a may also be driving wheels and provided with hydraulic motors.

Wheels 2b are carried by the transverse arms 5 forming deformable parallelograms, said arms being articulated at 6 on the chassis frame and the suspension being provided by hydropneumatic jacks 7 which are themselves suspended onto the chassis frame by axles 8 and brackets 9. Wheels 2b are driven by hydraulic motors 10.

At one end of the chassis frame, in this embodiment beyond wheels 2a, is mounted a box body 11 in which are lodged the combustion engines, the pumps, the exchangers and the tanks providing oil under pressure for supplying hydraulic motors such as at 10, drive jacks and similar equipments of the dumper.

The tipper is mounted on the chassis frame via a pin 12 upon which are articulated side frame members 13 rigid with the tipper 14. The pin 12 is situated above and beyond the wheel axis 2b. At its other end, the tipper is articulated at 14 with the end of at least one jack schematically shown by its operation line 16, the other end of the jack being articulated at 17 on a low point of the chassis frame 1. Jack 16 can therefore urge tipping of tipper 14 about pin 12 in order to bring it in the discharge position shown in dotted lines in FIG. 1. The tipper 14 may be keyed in normal position by blocking jacks such as in 18.

According to the invention, at the end of the chassis frame 1 situated beyond the articulation points of arms 5 of the wheels support, is mounted a driver's cab 19, said cab being located between the two longitudinal planes in which move the side frame members 13 during the tipping movement and inside the surface of revolution remaining free below the tipper bottom 20 during its tipping movement.

The cab 19 comprises in known manner a windscreen 21, side access doors 21' with access ladders which are not shown and all usual accessories.

With such an embodiment, the dumper the wheels 2a of which are steering wheels but the wheels 2b of which, or the four wheels, could all be steering and driving wheels, may be conducted in a precise manner due to the excellent visibility on wheels 2b which is afforded to the driver from his cab, in order to ring the edge 22 of the tipper above the discharge site. It is clear that a second cab could be provided on the box body 11, but the only real steering problems consist in bringing the discharge edge 22 of the tipper above a precise point so that cab 19 only is sufficient.

Figure 4:
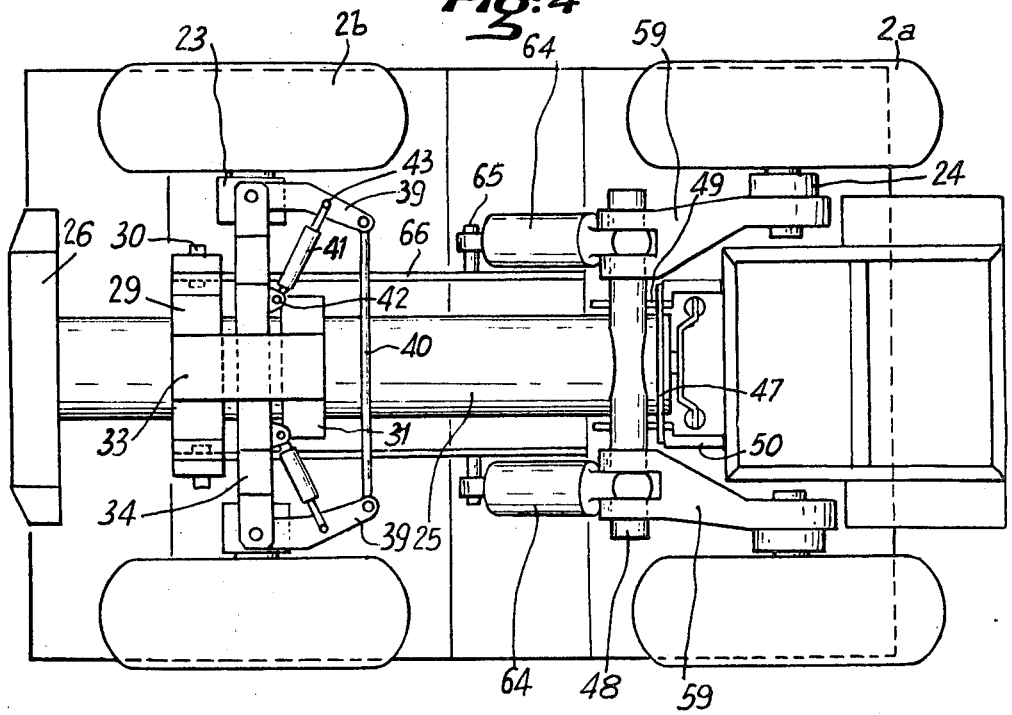
FIG. 4 is a view from underneath of the dumper of FIG. 3.

In the dumper shown in FIG. 3 to 7, the two front wheels 2b are steering and driving wheels and the two rear wheels 2a are driving wheels. Reference numerals 23 and 24 apply respectively to the axle-boxes of said wheels in which are preferably incorporated in known manner the traction hydraulic motors.

The frame is substantially made of one tubular element 25 ending in its front portion with a bumper 26. In its forward portion, the tubular element 25 carries an axle 27 provided for the tipping of cab 28, a fork 29 with, at the end of each side arms, a transverse axial stump 30 corresponding to the tipper tipping axis and a reinforcement annular piece 31 on which is mounted a jack 32 assisting the main jacks described hereinbelow at the beginning of the tipping movement, the body of fork 29 and of the reinforcement annular piece 31 being fixedly connected by a longitudinal reinforcement cross beam 33. On the portion of the tubular element 25 situated between the fork body 29 and the reinforcement annular piece 31 is rotatably mounted about the axis by bearing means such as crown ball bearings which are not shown, the central annular portion 34 of the forward cross beam (see FIG. 5). This cross beam comprises, symmetrically in relation to its axial plane, an upper arm 35 and a lower arm 36. The upper arm carries a hydropneumatic jack 37, the piston rod 38 of which is slidably guided in the lower arm 36. On said rod 38 and between arms 35 and 36 is rotatably mounted axle-box 23 of the corresponding front wheel in such manner that the wheel is suspended while being movable relative to the axis of rod 38. Each of axleboxes 23 carries (FIG. 4) a link 39 and the end of the links of both front wheels are connected by a coupling rod 40. Hydraulic jacks 41 act between a point 42 on the cross beam and a point 43 on the link, and they are energized under the control of a steering valve subjected to the steering wheel.

The central annular portion 34 of the front cross beam is fixedly connected to a rocking bar 43 axially crossing tube 25 through openings 44 (FIG. 5). In the centre of rocking bar 43 is keyed a longitudinal shaft 45 extending through cylinder 25 where it is guided by supports 46.

At the rear end of tube 25 are welded transverse plates of the chassis frame 47, and under the tube, a transverse axle 48. Plates 47 carry distance plates 49 and portions of side frame members 50, which with their distance plates 51 form the frame supporting motor 52, pump 53 and the accessories of the pressurized oil generating unit such as the radiator, etc., which are enclosed into a peripheral housing 54. The distance plates 49 carry the two side support plates 55 for the tipper which will be described hereafter. Under each plate 55 is articulated about an axis 56 the rod of a hydropneumatic jack 57, the body of which is articulated at one end of rocking bar 58 keyed on the end of rod 45.

At each end of shaft 48 is articulated a rocking lever 59 carrying the axle-box 24 of a rear wheel 2a. Between pin 60 mounted via flanges 61 on plate 55 and shaft 62 mounted on each rocking lever 59 is acting a hydropneumatic jack 63 with adjustable pressure forming a suspension hoist. The load of the tipper applied on plates 55 is thereby directly transferred to the rear wheels 2a.

The tipper tipping jacks 64 act between transverse axle 48 on which their body is articulated, and a shaft stump 65 carried by the rear portion of the rear end of the tipper support flange 66. The two tipper support flanges 66 are articulated in the forward direction onto pins 30 of fork 29, and they comprise in between a transverse bracket 67 which is engaged at the beginning of the tipping movement by the jack rod 32 for promoting the coming off operation Tipper 68 as such is formed with metal sheets comprising side and lower reinforcement box girders 69 (not shown). The tipper assumes, as is usual, the configuration of a truncated pyramid with its larger base 70 on top and provided with a discharge spout 71 extending forward above the cab. At the rear, the tipper carries a hood 72 adaptable on the housing 54 for providing protection to the motor unit during loading. Hood 72 is rigid with the tipper in order to free, when the tipper is in its tipped position, the driver's field of view when sitting in cab 20 towards the rear. In the tipper tipped position, and as is shown in FIG. 7, spout 71 of the tipper comes to bear, via shock absorbers which are not shown, against bumper 26, thereby allowing to spread the heap of material discharged by the tipper with the tipper spout 71.

The hereabove embodiments have been described as examples and may receive many modifications without departing from the scope of the present invention.

What we claim is:

1. A dumper of the type comprising a chassis frame provided with at least four carrying wheels, two of which at least being driving wheels, with a tipper articulated on the chassis frame about an axis situated in the vicinity of one end of the chassis frame above the corresponding wheel axle and on the side thereof which is opposite the other end of the chassis frame, the bottom of the tipper enveloping while it tips a cylindrical sector surface with a radius superior to the radius of the wheels situated at said end, wherein a driver's cab is lodged between said wheels inside the volume limited by said cylindrical sector surface.

2. A dumper according to claim 1, wherein the driver's cab is situated in the vicinity of the tipping axis of the tipper and is the main driving cab.

3. A dumper according to claim 1, wherein the chassis frame is formed of a forward portion comprising a cross member carrying the steering wheels and support elements for the cab and the tipping articulation axle brackets of the tipper, as well as a rear portion comprising the suspension devices for the rear wheels, the motor unit and support elements for the tipper, both front and rear portions being connected by a longitudinal element acting as a pivot for at least the front cross member carrying the front wheels.

4. A dumper according to claim 3, wherein there is provided a torque transfer element between the cross member carrying the front wheels and the rear portion of the chassis frame.

5. A dumper according to claim 3, wherein the longitudinal element is a tubular element.

6. A dumper according to claim 5 wherein the cross member which carries the front wheels is secured to a rocking bar diametrically crossing the tubular element through two openings in diametral facing relationship, the longitudinal rod at the rear end of is keyed to a second rocking bar which has acting on each end, a hydropneumatic jack the pressure of which is adjustable as a function of the load.

7. A dumper according to claim 3 6, wherein the axle-box of each front wheel is rotatably mounted about an axle perpendicular to its own axis and coaxial with the axis of the suspension device, said device and said perpendicular axle being guided and supported by the front wheels cross bar.

8. A dumper according to claim 7, wherein steering is provided by a rod linking system comprising two links rigidly locked each with an axle-box, the end of said two links being connected by a tie-rod and the rotation being urged by at least one jack acting between one point of the cross member and one point of the rod linking system.

9. A dumper according to claim 3, wherein the rear unit is rigid with the rear end of the longitudinal element and comprises a frame carrying the support plates for the tipper and the transverse shaft upon which are articulated the two rocking levers carrying the rear wheel axle-boxes, the suspension being provided by hydropneumatic jacks acting between each support plate and a point of each rear wheel rocking lever.

10. A dumper according to claim 9, wherein jacks are provided for the tipper which are articulated at their end opposite the tipper to the transverse shaft carrying the rear wheels rockings levers.